(12) United States Patent
Marsh et al.

(10) Patent No.: US 7,783,376 B2
(45) Date of Patent: Aug. 24, 2010

(54) PHOTOGRAMMETRIC CONTRASTING LIGHT FOR HOLE RECOGNITION

(75) Inventors: Bobby J. Marsh, Lake Stevens, WA (US); Michael A. Lazar, Arlington, WA (US)

(73) Assignee: The Boeing Company, Chicago, IL (US)

(*) Notice: Subject to any disclaimer, the term of this patent is extended or adjusted under 35 U.S.C. 154(b) by 358 days.

(21) Appl. No.: 12/028,568

(22) Filed: Feb. 8, 2008

(65) Prior Publication Data
US 2008/0123112 A1   May 29, 2008

Related U.S. Application Data

(63) Continuation-in-part of application No. 11/518,471, filed on Sep. 8, 2006, now Pat. No. 7,587,258, and a continuation-in-part of application No. 11/432,061, filed on May 10, 2006, now Pat. No. 7,454,265.

(51) Int. Cl.
*G06F 19/00* (2006.01)
(52) U.S. Cl. .................. 700/195; 700/159; 700/166; 702/159; 356/3; 356/622; 356/625
(58) Field of Classification Search .................. 700/159, 700/166, 195; 702/159; 356/3, 622, 625
See application file for complete search history.

(56) References Cited

U.S. PATENT DOCUMENTS 6,097,489 A * 8/2000 Burger et al. ............... 356/614
6,269,565 B1 * 8/2001 Inbar et al. .................. 40/361
6,593,563 B2 * 7/2003 Blohbaum ............... 250/208.2
6,826,299 B2   11/2004 Brown et al.
6,980,881 B2   12/2005 Greenwood et al.
2004/0039465 A1   2/2004 Boyer et al.
2007/0297665 A1 * 12/2007 Segev ..................... 382/141

FOREIGN PATENT DOCUMENTS

EP       1447644 A1   8/2004
WO    WO 97/14015 A1   4/1997

OTHER PUBLICATIONS

"Vstars/s Acceptance Test Results", by John Brown, Geodetic Services, 1997.*
International Searching Authority Notification PCT/US2007/011398 received Jan. 3, 2008.

* cited by examiner

*Primary Examiner*—Michael D Masinick
(74) *Attorney, Agent, or Firm*—Klintworth & Rozenblat IP LLC

(57) ABSTRACT

A system for measuring a hole of a surface may include at least one light emitting member for emitting varied intensity flashes of light towards the hole of the surface. The system may further include a projector for projecting light beams onto the surface. The system may additionally include at least one camera for taking at least one picture of the hole of the surface each time the at least one light emitting member emits a flash of light towards the hole of the surface, and each time the projector projects light beams onto the surface. The system may also include a computer for determining measurements of the hole of the surface utilizing the at least one picture of the hole and Photogrammetry.

25 Claims, 12 Drawing Sheets

US 7,783,376 B2

PHOTOGRAMMETRIC CONTRASTING LIGHT FOR HOLE RECOGNITION

CROSS REFERENCES TO RELATED APPLICATIONS

This application is a continuation-in-part of U.S. patent application Ser. No. 11/518,471, filed on Sep. 8, 2006, and is also a continuation-in-part of U.S. patent application Ser. No. 11/432,061, filed on May 10, 2006.

BACKGROUND OF THE DISCLOSURE

1. Field of the Disclosure

The present disclosure generally relates to the use of optical techniques using high intensity flashes of light, Photogrammetry, and/or laser tracking to make precise measurements of the holes of a surface.

2. Description of the Related Art

A variety of processes have been employed to measure holes of a surface, such as to measure the holes of a fuselage or wing structure. Under one present process, technicians spend hours applying hot glue and steel sphere targets into each of the 1,500 holes of a section of a 787 Fuselage. Two expensive laser radar systems are then utilized to measure the 1,500 steel sphere targets in 17 to 24 hours. Subsequently, 3 to 4 hours are needed to remove the hot glue and the 1,500 steel spheres. This process is time consuming, expensive, and labor intensive.

Accordingly, there is a need for a hole measuring system and/or process that alleviates one or more of these problems, and allows relatively rapid, accurate measurements of the holes of a surface. The present disclosure is directed toward satisfying this need.

BRIEF SUMMARY OF THE DISCLOSURE

Under one aspect of the disclosure, a system for measuring a hole of a surface is provided. The system may comprise at least one light emitting member for emitting varied intensity flashes of light towards the hole of the surface. The system may further comprise a projector for projecting light beams onto the surface. The system may additionally comprise at least one camera for taking at least one picture of the hole of the surface each time the at least one light emitting member emits a flash of light towards the hole of the surface, and each time the projector projects light beams onto the surface. The system may also comprise a computer for determining measurements of the hole of the surface utilizing the at least one picture of the hole and Photogrammetry.

Under another aspect of the disclosure, a method of measuring a hole of a surface is disclosed. In one step, varied intensity flashes of light may be emitted from at least one light emitting member towards the hole of the surface. In another step, the hole of the surface may be photographed utilizing at least one camera each time a flash of light from the at least one light emitting member is emitted towards the hole of the surface. In an additional step, light beams may be projected onto the surface utilizing a projector. In still another step, the hole of the surface may be photographed utilizing the at least one camera when the projector projects light beams onto the surface. In yet another step, measurements of the hole of the surface may be determined utilizing a computer, the photographs taken of the hole by the at least one camera, and Photogrammetry.

These and other features, aspects and advantages of the disclosure will become better understood with reference to the following drawings, description and claims.

DETAILED DESCRIPTION OF THE DISCLOSURE

FIGS. 1 through 6 depict a step by step process for measuring an outer surface of a mandrel assembly and for measuring an outer surface of a barrel of an aircraft. The process may be used, however, to measure one or more differing types of surfaces on any type of part. The surface measuring process may be utilized to measure surfaces in both aircraft and non-aircraft applications.

Figure 1:
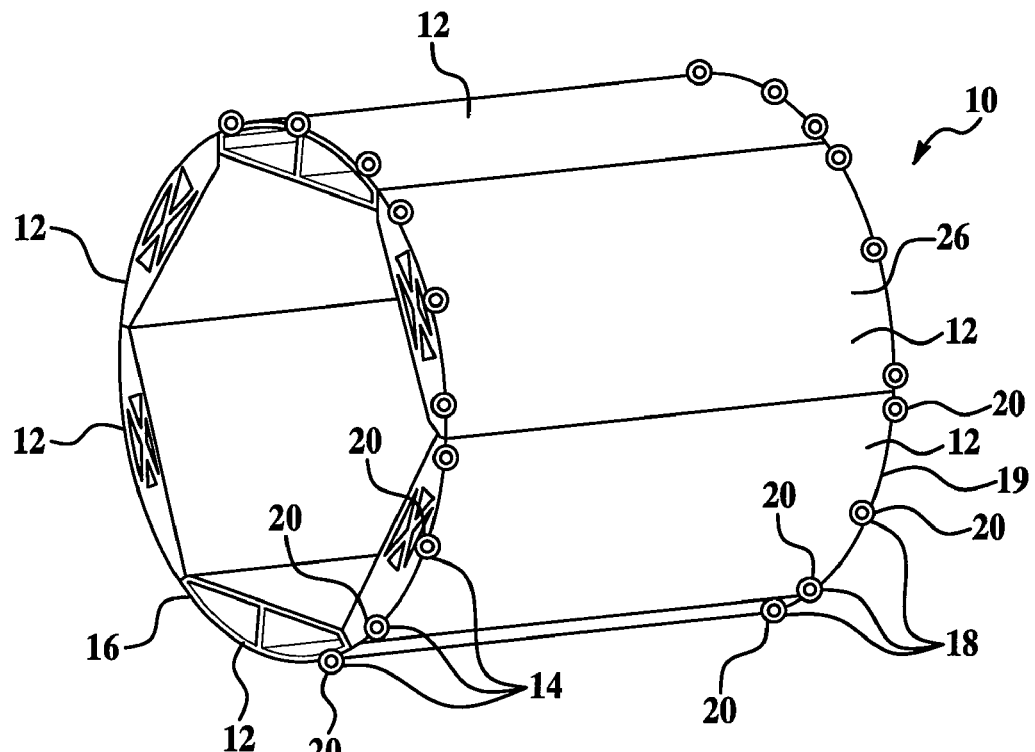
FIG. 1 is a perspective view of a mandrel assembly having targets installed.

FIG. 1 depicts a mandrel assembly 10, which may comprise six steel mandrel sections 12 attached together as with bolts, or other fasteners to form a generally cylindrical shape, or "barrel". The outer surface 26 of the mandrel assembly 10 includes sixteen lay-up mandrel holes 14 at the forward portion 16 of the mandrel assembly 10 and another sixteen lay-up mandrel holes 18 at the aft portion 19 of the mandrel assembly 10. More or less number of mandrel holes may be used, depending on the particular application. A separate target 20 may be installed on each of the thirty-two mandrel holes 14 and 18, resulting in a total of thirty-two installed targets 20 covering the forward 16 and aft 19 portions of the mandrel assembly 10. The targets 20 may be installed into the holes utilizing a snap-fit or other installation mechanism or device known in the art.

Each of the thirty-two targets 20 may have reflectors (not shown) which are adapted to reflect Photogrammetry light beams, and separate reflectors (not shown) which are adapted to reflect laser beams emitted from laser tracking devices. The locations of each of the targets 20 are simultaneously measured using both Photogrammetry devices and laser tracking devices. The targets 20, which will be discussed later in more detail, may comprise any of the embodiments disclosed in U.S. Patent Application Serial Number (Serial No. Not Yet Assigned) filed May 19, 2006, and entitled "Combination Laser and Photogrammetry Target", the entirety of which is hereby incorporated by reference herein. In other embodiments, the targets 20 may be in any size, type, shape, configuration, orientation, and/or location.

Figure 2:
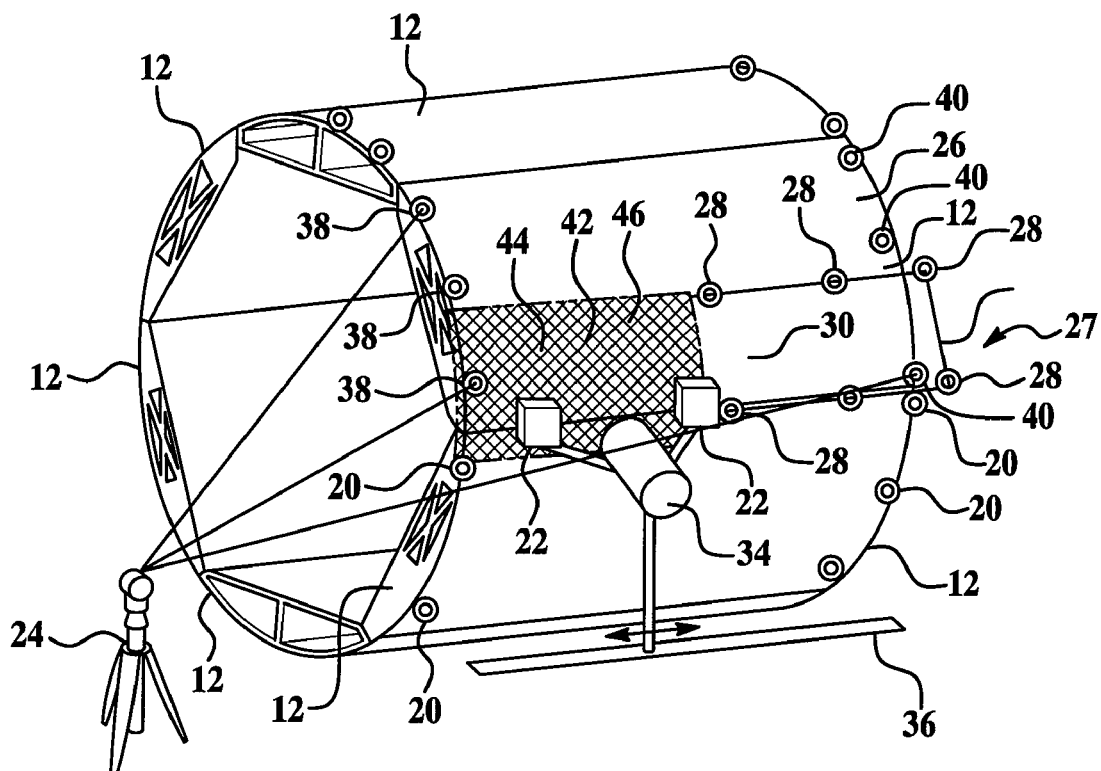
FIG. 2 is a perspective view of the mandrel assembly of FIG. 1 with a laser tracker and two Photogrammetry devices taking measurements of the mandrel assembly.

As shown in FIG. 2, one or more Photogrammetry devices 22 and one or more laser trackers 24 may be utilized to measure the outer surface 26 of the mandrel assembly 10 by simultaneously measuring the locations of one or more of the targets 20 utilizing both Photogrammetry and laser tracking. The laser tracking measurements may be taken by emitting one or more laser beams from the one or more laser trackers 24 towards the outer surface 26 of the mandrel assembly 10. The laser beams may be reflected off the laser reflectors of one or more of the targets 20 back towards the laser trackers 24, which measure one or more target locations in X, Y, and/or Z planes based on the properties of the returned laser beam.

Simultaneously, the Photogrammetry measurements may be taken by emitting one or more light beams from one or more Photogrammetry devices 22 towards the outer surface 26 of the mandrel assembly 10. The light beams are reflected off the Photogrammetry reflectors of one or more of the targets 20 back towards the Photogrammetry devices 22, which measures one or more of the target locations in X, Y, and/or Z planes based on the properties of the returned light beams. The Photogrammetry devices 22 may comprise one or more commercially available cameras such as V-Star cameras.

In order to measure the entire outer surface 26 of the mandrel assembly 10, various portions of each mandrel section 12 are measured separately. By rotating the mandrel assembly 10 a predetermined angle a predetermined number of times, the entire outer surface 26 of the mandrel assembly 10 may be measured. In the case of one particular aircraft, the mandrel assembly 10 may be twenty-four feet long. A twenty-four foot long rectangular frame 27, containing ten additional targets 28 distributed around the frame 27, may be placed in close proximity to a portion of one 30 of the mandrel sections 12. One laser tracker 24 is placed nearby the mandrel assembly 10. Two Photogrammetry devices 22, which may comprise two linked V-Star cameras, may be joined to a commercially available Pro-Spot light projector 34 and to a track 36 extending along a length of the mandrel assembly 10.

The laser tracker 24 simultaneously measures the locations of three targets 38 at the forward portion of the mandrel section 30 being measured, the locations of three targets 40 at the aft portion of the mandrel section 30 being measured, and the locations of the ten targets 28 distributed around the frame 27. Simultaneously, the Pro-Spot projector 34 emits one or more light beams defined by hundreds of dots onto an eight-foot long portion 42 of the surface 44 of the mandrel section 30 covered by the frame 27. The two linked V-Star cameras 22 record a combined digital photograph covering a six-foot long area 46 within the frame 27. The combined digital photograph shows the positioning of the hundreds of dots on the surface of the mandrel section. As a result, the position of the light beams emitted by the Pro-Spot projector 34 can be measured utilizing Photogrammetry.

The digital Photogrammetry photograph, in conjunction with the laser tracker measurements of the targets 20, allow a determination to be made as to the surface measurements in X, Y, and/or Z planes of the portion of the mandrel section within the digital photograph. The Pro-Spot projector 34 and the two linked V-Star cameras 22 move in six foot increments horizontally along the track 36, in order to record three more digital photographs which may cover the length of the mandrel section 30. The mandrel assembly 10 may be rotated a total of ten times in thirty-six degree increments in order to take a total of forty digital photographs of the entire outer surface 26 of the mandrel assembly 10. In this manner, measurements in X, Y, and/or Z planes, of the entire outer surface of the mandrel assembly can be determined utilizing Photogrammetry.

After, or during, each of the ten rotations of the mandrel assembly 10, the laser tracker 24 simultaneously measures the locations of the ten targets 28 distributed along the frame 27 in addition to the locations of the six targets 38 and 40 located at the forward and aft portions of each respective mandrel section. In this manner, by rotating the mandrel assembly 10 a total of ten times in thirty-six degree increments, measurements of the locations of each of the targets distributed around the entire outer surface of the mandrel assembly can be determined utilizing laser tracking.

The Photogrammetry and laser tracking measurements of the locations of the targets 20 and of the outer surface 26 of the mandrel assembly 10 are integrated together utilizing one or more computers. In one embodiment, the location measurements in the X, Y, and/or Z planes taken by the laser tracker may be downloaded from the laser tracker computer to a Photogrammetry computer, which combine the data into one or more combined measurements. The laser tracker computer may be a spatial analyzer lap-top and the Photogrammetry computer may be a V-Star Photogrammetry lap-top. The Photogrammetry measurements are sometimes referred to as "point-cloud". A point cloud is a set of three-dimensional points describing the outlines or surface features of an object. The there dimensional Photogrammetry measurements may be transformed to the laser tracking measurements to determine a more accurate, and/or more efficient combined measurement of the outer surface 26 of the mandrel assembly 10.

One or more software programs may be utilized to create a three-dimensional computer generated image of the outer surface 26 of the mandrel assembly 10. By utilizing Photogrammetry and laser tracking devices simultaneously, relatively quick and accurate measurements of the mandrel assembly's outer surface 26 may be determined. The entire outer surface 26 of the mandrel assembly 10 may be measured relatively quickly compared to other measurement techniques by simultaneously utilizing both Photogrammetry and laser tracking.

Figure 3:
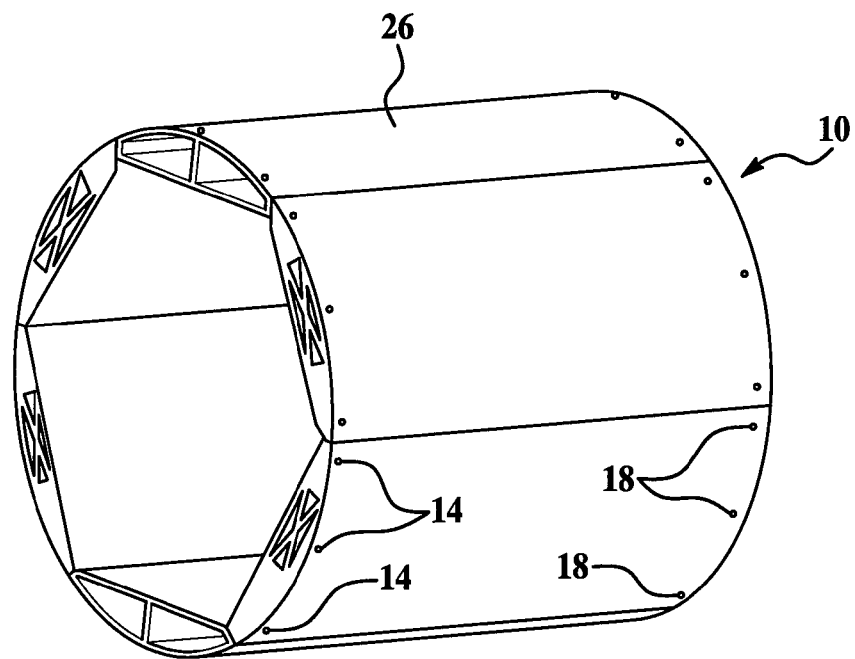
FIG. 3 is a perspective view of the mandrel assembly of FIG. 1 with the targets removed.
Figure 4:
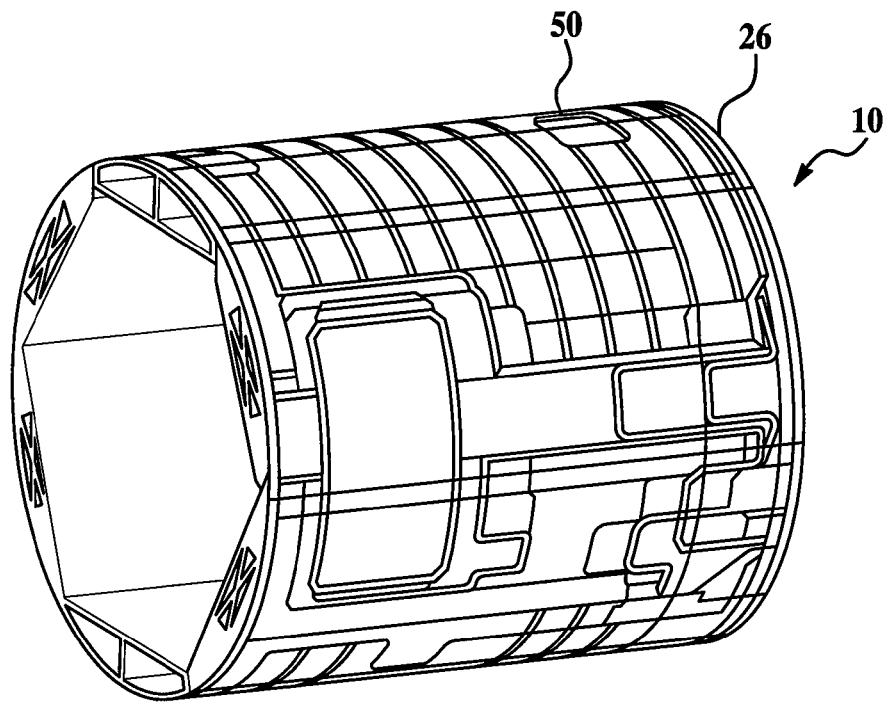
FIG. 4 is a perspective view of a cured barrel disposed over the mandrel assembly of FIG. 1.

As shown in FIG. 3, after measuring the outer surface 26 of the mandrel assembly 10, the targets 20 are removed from the forward and aft mandrel holes 14 and 18. A fiber placement lay-up machine is used to distribute curing material around the outer surface 26 of the mandrel assembly 10. The mandrel assembly 10 may be inserted into an auto-clave to cure the material around the outer surface 26 of the mandrel assembly 10 in order to manufacture a barrel. FIG. 4 depicts a fully-cured barrel 50 disposed over the outer surface 26 of the mandrel assembly 10 which may be produced after removing the mandrel assembly 10 from the auto-clave. The barrel 50 may represent a portion of an aircraft such as one or more portions of the fuselage.

Figure 5:
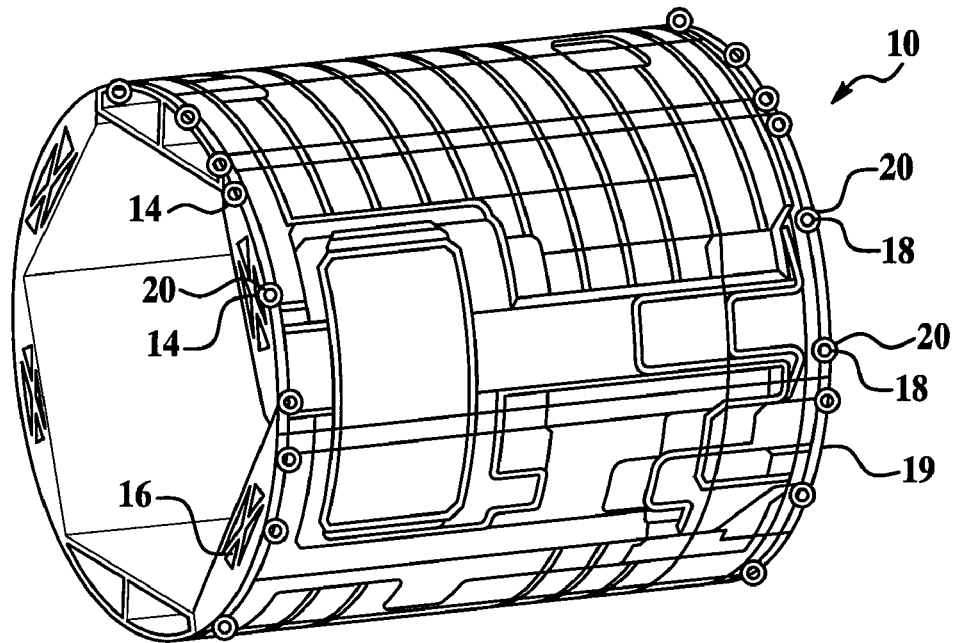
FIG. 5 is a perspective view of the cured barrel of FIG. 4 with targets installed on the mandrel assembly.

As shown in FIG. 5, thirty-two targets 20 are re-installed, utilizing a snap-fit or other installation mechanism known in the art, into each of the respective thirty-two lay-up mandrel holes 14 and 18 at the forward and aft portions 16 and 19 of the mandrel assembly 10. In other embodiments, more or less number of targets 20 may be utilized in varying locations, orientations, and configurations.

Figure 6:
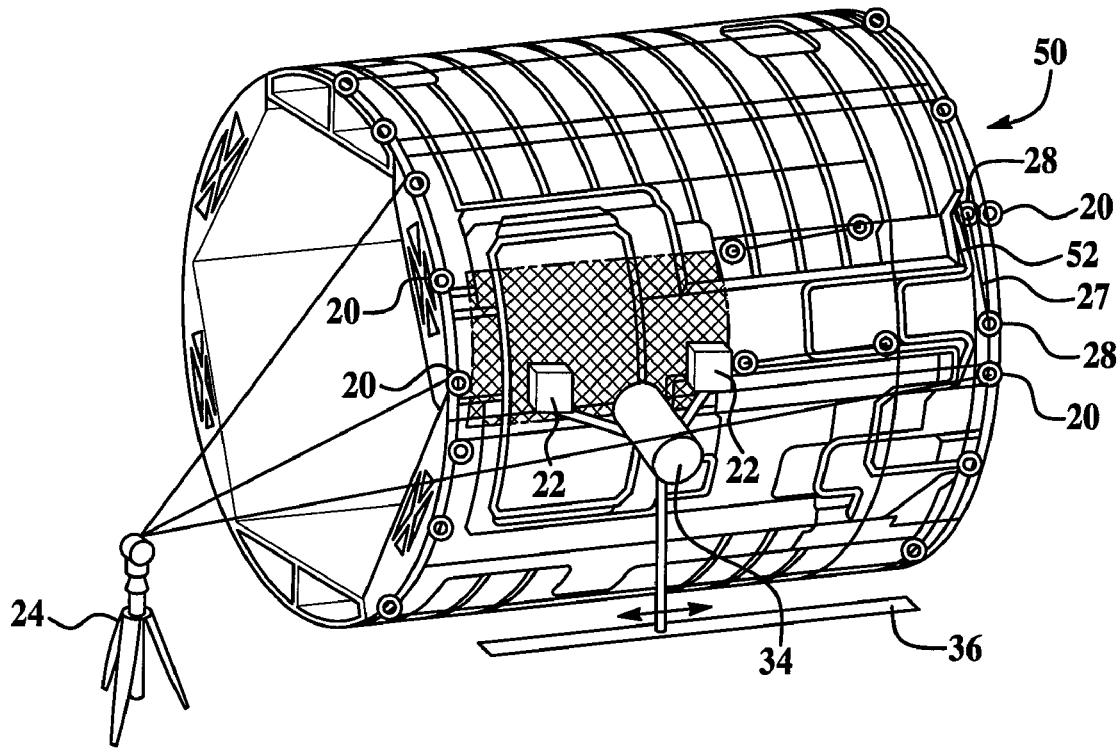
FIG. 6 is a perspective view of the mandrel assembly/barrel arrangement of FIG. 4 with a laser tracker and two Photogrammetry devices taking measurements of the barrel.

As depicted in FIG. 6, the outer surface 52 of the barrel 50 can be measured utilizing the same Photogrammetry and laser tracking procedure as described above to measure the outer surface 26 of the mandrel assembly 10. In the illustrated embodiment, the barrel 50 is rotated thirty-six degrees ten separate times to fully measure the outer surface 52 of the barrel 50. At each rotated position, four digital Photogrammetry photographs may be taken incrementally along the length of the barrel 50 utilizing two V-Star cameras 22, the Pro-Spot light projector 34, the frame 27, and the laser tracker 24, all working in conjunction with each other as previously described in the discussion of the mandrel assembly 10 measurement process. In one embodiment where the barrel is twenty-four feet long, four digital Photogrammetry photographs are taken with each photograph covering a distance of approximately six to eight feet of the length of the barrel 50. A total of forty digital Photogrammetry photographs are taken to cover the entire outer surface 52 of the barrel 50.

As previously described in connection with the mandrel assembly 10 measurement process, the laser tracker 24 simultaneously measures the locations of one or more of the targets 20 distributed around the mandrel assembly 10, while simultaneously measuring the locations of one or more of the additional targets 28 distributed around the frame 27. By rotating the barrel 50 one full rotation, the locations of all of the targets 20 distributed around the mandrel assembly may be ascertained.

The Photogrammetry and laser tracking measurements of the locations of the targets and of the outer surface 52 of the barrel 50 may be integrated together utilizing one or more computers as previously described during the discussion of the mandrel assembly 10 measurement process. In one embodiment, the location measurements in the X, Y, and/or Z planes taken by the laser tracker may be downloaded from the laser tracker computer to a Photogrammetry computer. The laser tracker computer may comprise a spatial analyzer lap-top and the Photogrammetry computer may be a V-Stars Photogrammetry lap-top. The Photogrammetry measurements (also referred to as point-cloud) may be transformed to the laser tracking measurements to determine a more accurate, and/or more efficient combined measurement of the outer surface 52 of the barrel 50. One or more software programs may be utilized to create a three-dimensional computer generated image of the outer surface 52 of the barrel 50.

By utilizing Photogrammetry and laser tracking devices simultaneously, relatively quick and accurate measurements of the barrel's outer surface 52 may be determined. The entire outer surface 52 of the barrel 50 may be measured in approximately fifty minutes, comprising approximately five minutes per portion of the barrel disposed over each of the ten respective mandrel sections. In other embodiments, the measurement process may take less than an hour, or a differing amount of time, and may follow differing steps in order to measure the outer surface 52 of the barrel 50 simultaneously utilizing both Photogrammetry and laser tracking.

Since the barrel's inner surface may be assumed to be a close replica of the mandrel assembly's outer surface, the measurements of the barrel's inner surface may be taken to be the determined measurements of the mandrel assembly's outer surface. As such, the barrel's entire outer and inner surfaces may be determined utilizing the method of the instant disclosure. In still other embodiments, measurements of varying surfaces of any type of part may be determined utilizing varying versions of the disclosure's process.

One or more holes or other features may be machined in the barrel 50 utilizing the measurements determined by the combined Photogrammetry and laser tracking process. This machining can be performed for example using CNC controlled machining centers, such as a post mill or gantry type mill. These machining centers control movement of a cutting tool relative multiple axes, typically 3 or 5 axes, including movement in a direction parallel to the longitudinal axis of the barrel 50. In one embodiment, doors, and windows may be machined in the barrel 50 based on the Photogrammetry and laser tracking measurements. In other embodiments, differing parts of the barrel 50 may be manufactured and/or machined based on the Photogrammetry and laser tracking measurements.

The Photogrammetry and/or laser tracking procedure may be modified in various respects. For instance, a varying number of targets 20 may be utilized in varying orientations, configurations, and locations; the barrel 50 may be rotated a varying number of times and degrees; a varying number of Photogrammetry photographs may be taken utilizing different quantities and types of Photogrammetry devices; and varying types and quantities of laser trackers may be utilized. In still other embodiments, other portions of the Photogrammetry and/or laser tracking procedure may be modified to measure the outer surface 52 of the barrel 50.

Attention is directed to FIGS. 7-17 which depict a measurement system that combines the merged Photogrammetry and laser tracking technique described above with a traveling reference system that provides precise camera placement information. The camera placement information is used to spatially link the laser tracking and Photogrammetry measurements within the measurement volume. This system eliminates the need for using the previously discussed frame 27 (FIG. 6) and also eliminates the need for applying reflective tape for targets over the entire exposed area of the section of the barrel 50 that is being imaged.

A carriage generally indicated at 54, which may comprise, for example, a post mill 56, is mounted for linear movement on tracks 58 so as to traverse the length of the barrel 50. Although a post mill 56 has been shown in the illustrated embodiment, it is to be understood that other types of machining centers such as a gantry mill could be employed. The post mill 56 is a commercially available CNC machining center which includes a cutting tool (not shown) carried on the face of a slide plate 72 slidably mounted for vertical movement in ways 78 formed in upright supports of the post mill 56. Specifically, the cutting tool can be mounted on a tool holder (not shown) rotated by a motor 57 mounted on slide plate 72, which turns the tool to perform cutting operations. In the illustrated embodiment, the cutting tool has been replaced with a position confirmation bar 76, the purpose of which is to confirm the exact position of the cutting tool relative to surfaces and features on the barrel 50.

An elongate bracket 74 is mounted on the upper face of slide plate 72. A projector 34, of the type previously described, is mounted on a central portion of the bracket 74 and functions to illuminate sections of the barrel 50 with a dot pattern used in the Photogrammetry process. Digital Photogrammetry cameras 22 are mounted on the opposite ends of the bracket 74 and are oriented so as to image sections of the barrel 50 from different angles. The cameras 22 may comprise INCA(3) V-star type cameras of the type previously described. Alternatively, a single stereoscopic camera could be used. The bracket 74 is removable from the slide plate 72, allowing the post mill 56 to function as a normal machining cutter after surface measurements have been performed. Following cutting operations, the bracket 74 can then be reinstalled to carry out re-measurement of the barrel 50 to verify accuracy of the cuts.

Figure 9:
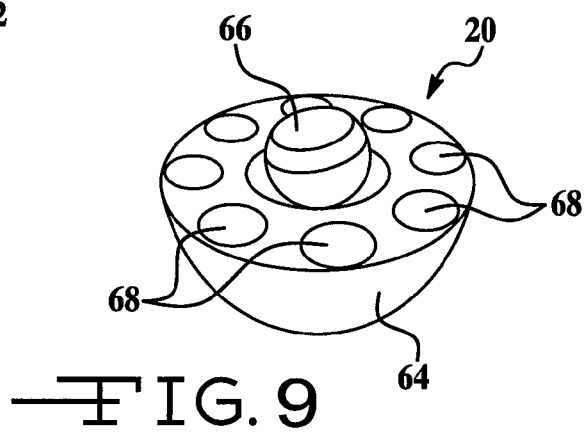
FIG. 9 is a perspective view of a reflective target.
Figure 10:
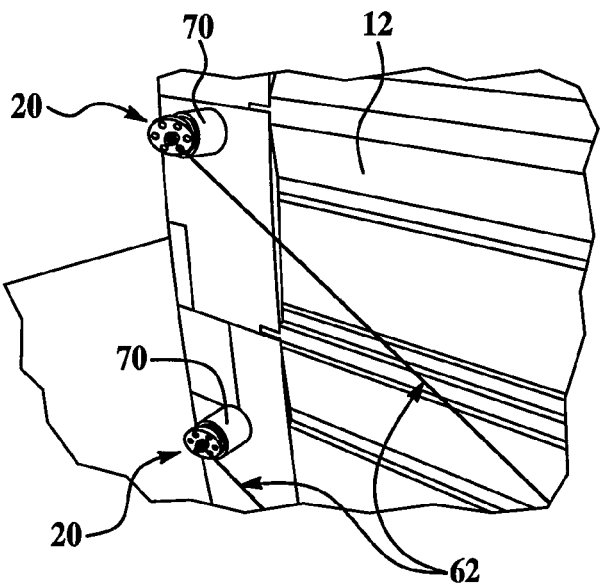
FIG. 10 is an enlarged, fragmentary view taken in perspective of an edge of the barrel and mandrel, showing targets reflecting laser beams to the laser tracker.
Figure 11:
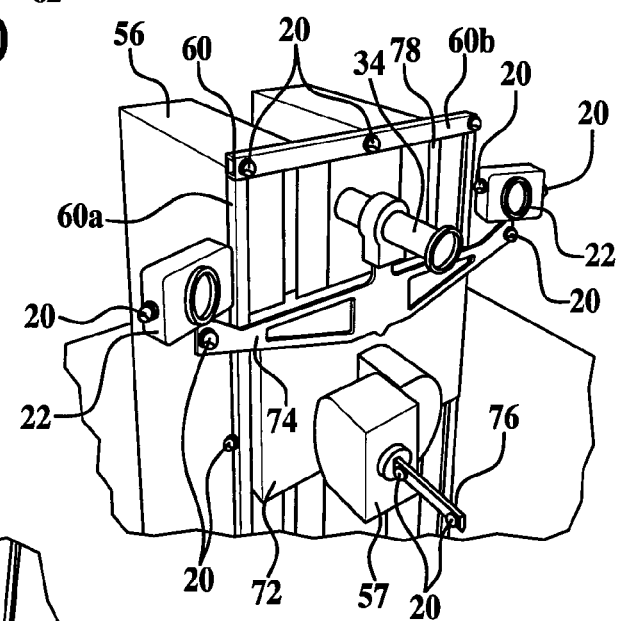
FIG. 11 is a fragmentary view, taken in perspective of the upper portion of the post mill shown in FIG. 7.
Figure 12:
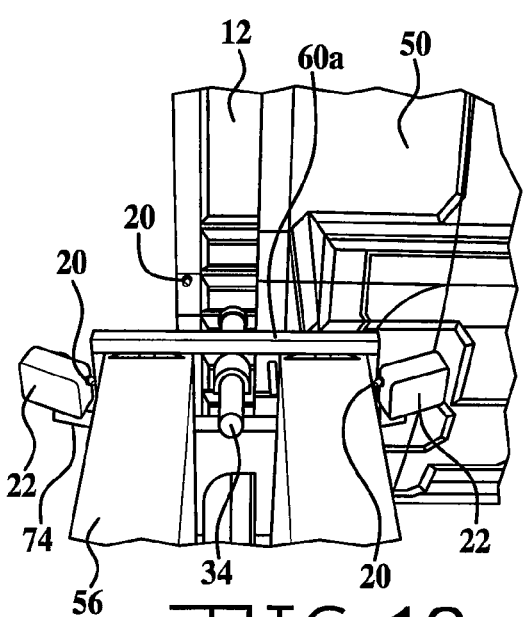
FIG. 12 is a fragmentary view taken in perspective showing the upper portion of the post mill relative to one side of the barrel and mandrel.
Figure 13:
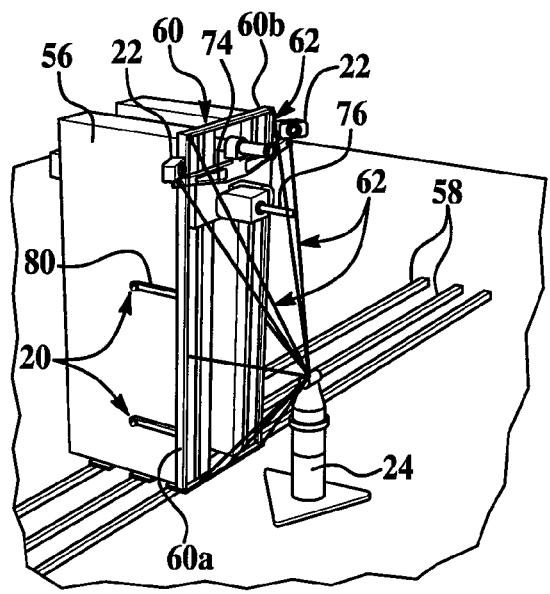
FIG. 13 is a perspective view showing the front of the post mill, and the path of laser beams used in measuring the position of the cameras.

As best seen in FIG. 10, reflective targets 20 are mounted on cylindrical adaptors 70 which are received within the previously discussed mandrel holes 14 and 18. As shown in FIG. 9, each of the reflective targets 20 comprises a spherically shaped body 64 having a central reflector 66 magnetically mounted on body 64, and a plurality of reflective, circular spots 68 surrounding the reflector 66. The center of the reflector 66 is intended to reflect a laser beam produced by the laser tracker 24, while reflective spots 68 reflect light used in the Photogrammetry process.

Figure 7:
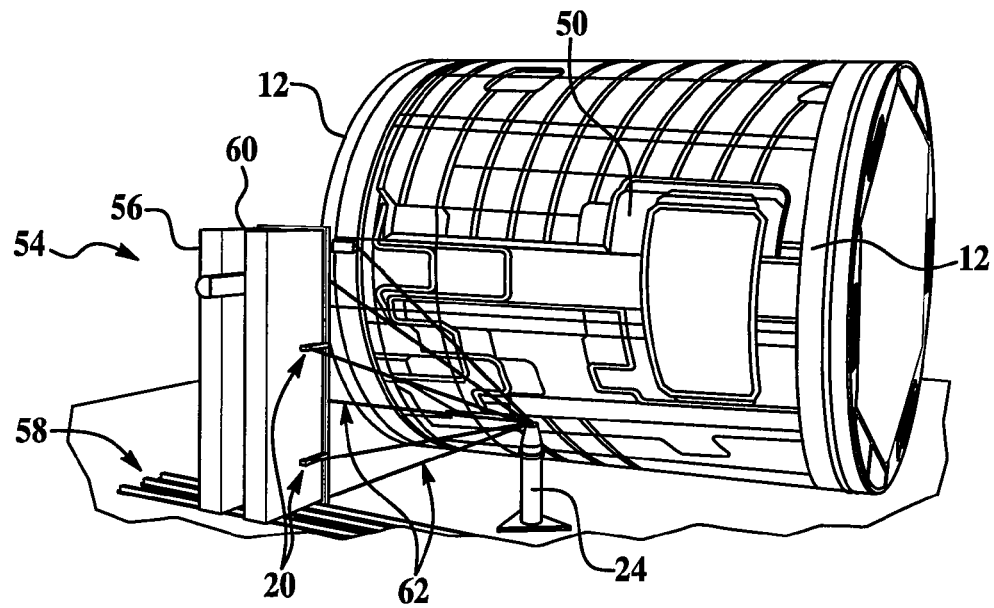
FIG. 7 is a perspective view showing a portion of a post mill in relation to a cured barrel on the mandrel assembly.
Figure 8:
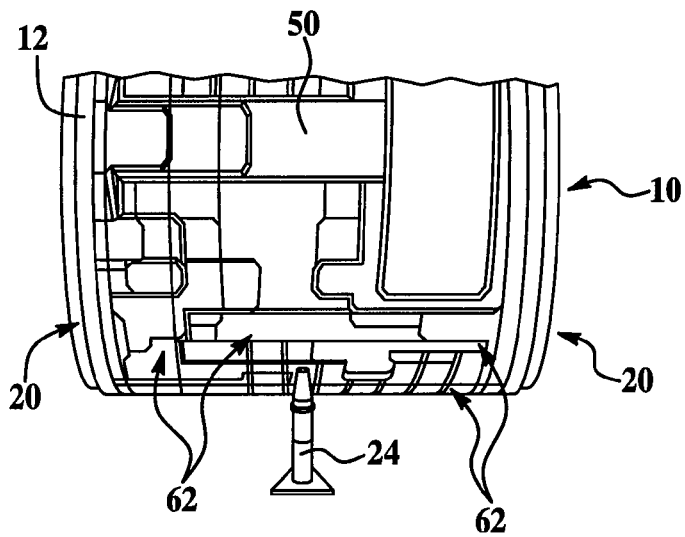
FIG. 8 is a fragmentary, side view of the barrel shown in FIG. 8 relative to a laser tracker.
Figure 14:
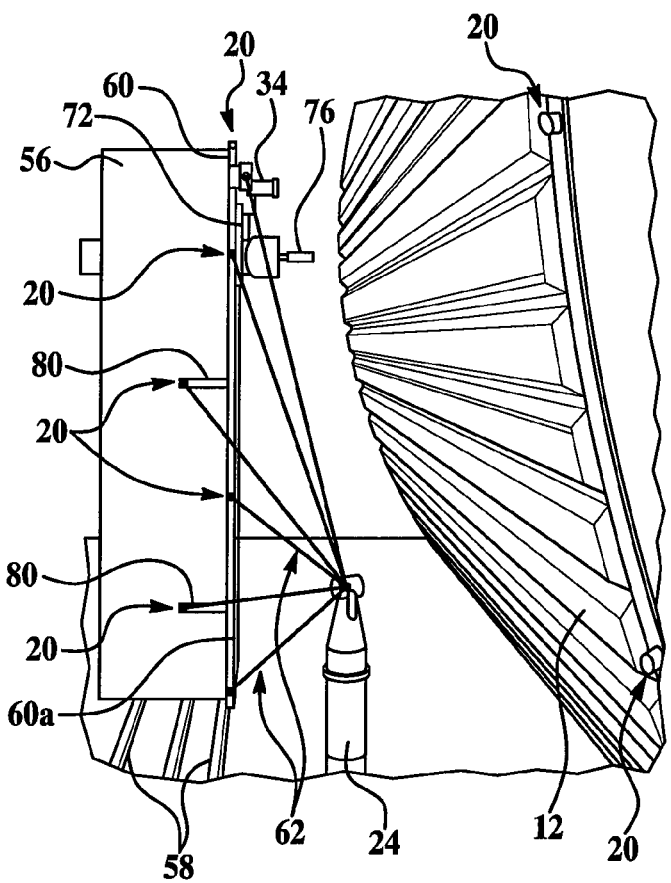
FIG. 14 is a fragmentary, side elevational view showing the post mill relative to the mandrel.
Figure 15:
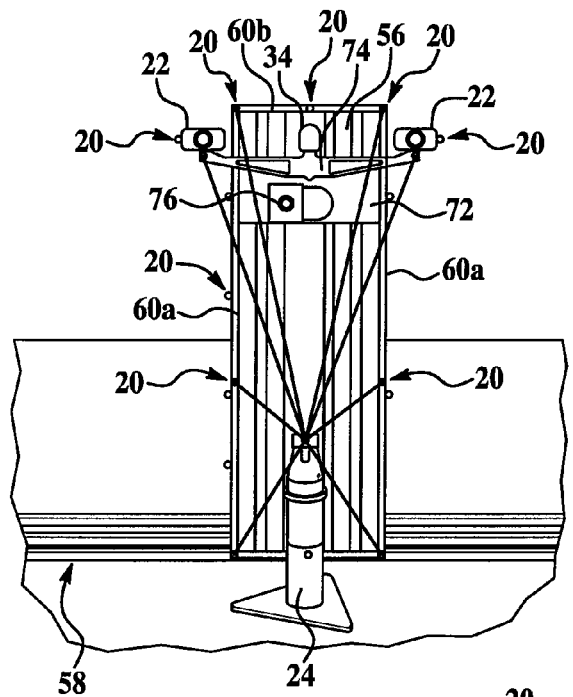
FIG. 15 is a front elevational view of the post mill.
Figure 16:
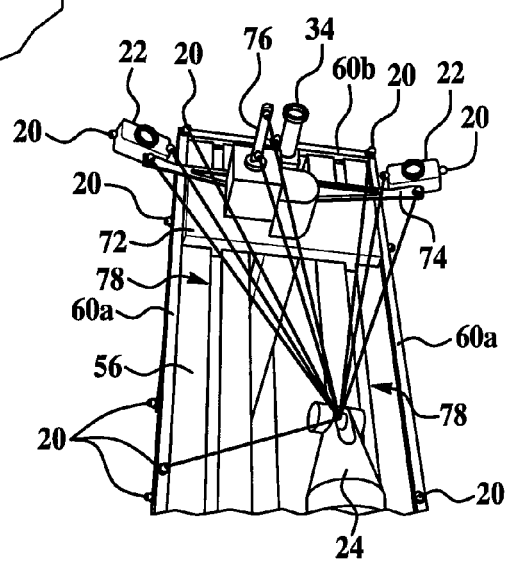
FIG. 16 is a perspective view of the upper portion of the post mill.
Figure 17:
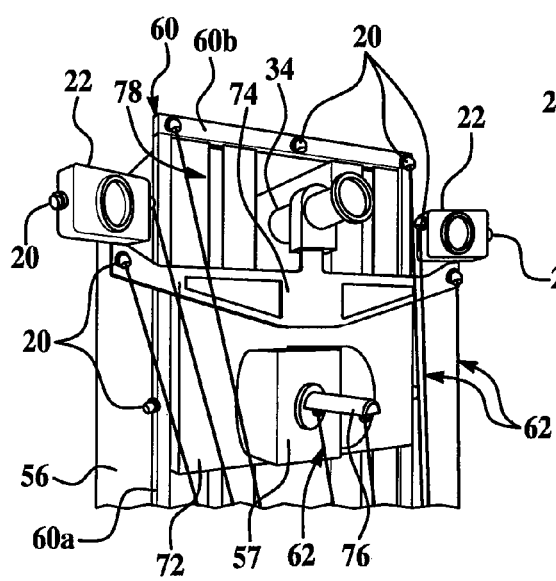
FIG. 17 is an enlarged, fragmentary view of the upper portion of the post mill.

As best seen in FIGS. 7 and 14, the laser tracker 24 is stationary mounted in a central position between the post mill 56 and the mandrel 12. The laser tracker 24 generates precise data fixing the position of the post mill 56, as well as the precise position the cameras 22 used in the Photogrammetry process. In order to generate this position information, a matrix of laser targets 20 are mounted on the cameras 22 and the post mill 56. Specifically, a pair of the targets 20 is mounted on opposite ends of each of the cameras 22. An array of additional targets 20 are mounted on the post mill 56 using a three sided frame 60 which may comprise, for example, Invar tubing of rectangular cross section. The three-sided frame 60 comprises a pair of upright members 60a connected at their upper extremities by a cross member 60b. The target matrix includes a frontal array of the targets 20 facing the mandrel 12, which comprises three targets 20 mounted on the cross member 60b and a pair of targets 20 mounted on the bracket 74. As best seen in FIG. 14, each side of the frame 60a mounts a side facing array of the targets 20, including targets mounted on rearward extensions 80 of the frame 60. From the target mounting arrangement described above, it can be appreciated that the laser tracker 24 maintains a line-of-sight view of multiple targets 20 on the post mill 56 as the post mill 56 moves throughout the length of the tracks 58.

In use, the post mill 56 is first positioned at one end of the tracks 58. The laser tracker 24 and the cameras 22 record the precise position of four targets 20 on the four forward tool holes in the mandrel 20. Simultaneously, the laser tracker 24 records the precise position of the cameras 20 and the position confirmation bar 76 by tracking the position of the matrix of targets 20 carried on the post mill 56. The laser tracker 24 remains stationary while the post mill 56 transports the cameras 22 to predetermined positions along the path of the tracks 58 where the barrel is imaged, until an entire rectangular section of the barrel 50 has been imaged. A commercially available spatial analyzer script is used to direct the laser tracker 24. The laser tracker 24 measures the position of the post mill 56 at each of the camera measurement station stops along the path of tracks 58. Typically, the laser tracker 24 uses a minimum of six of the targets 20 of the target matrix on post mill 56 during each station stop.

The technique described above results in a set of camera position data that is spatially linked to the Photogrammetry survey data so that the precise position of the cameras 22 is known for each set of measurement data that is taken. The laser tracker 24 also tracks the targets 20 on the position confirmation bar 76 at every position of measurement, thereby linking the CNC control program that operates the post mill 56 with the Photogrammetry survey data. As a result, after the Photogrammetry survey data has been taken, a machine operator can direct the post mill 56 to commence machining operations without the need for further setup or measurement operations to determine the position of the cutting tool relative to features on the barrel 50. In the event that the post mill 56 is out of position at the beginning of the machining operation, the operator need only to push a control button to cause the cutting tool to move to the precise starting position that has been confirmed by the laser tracker 24.

Figure 18:
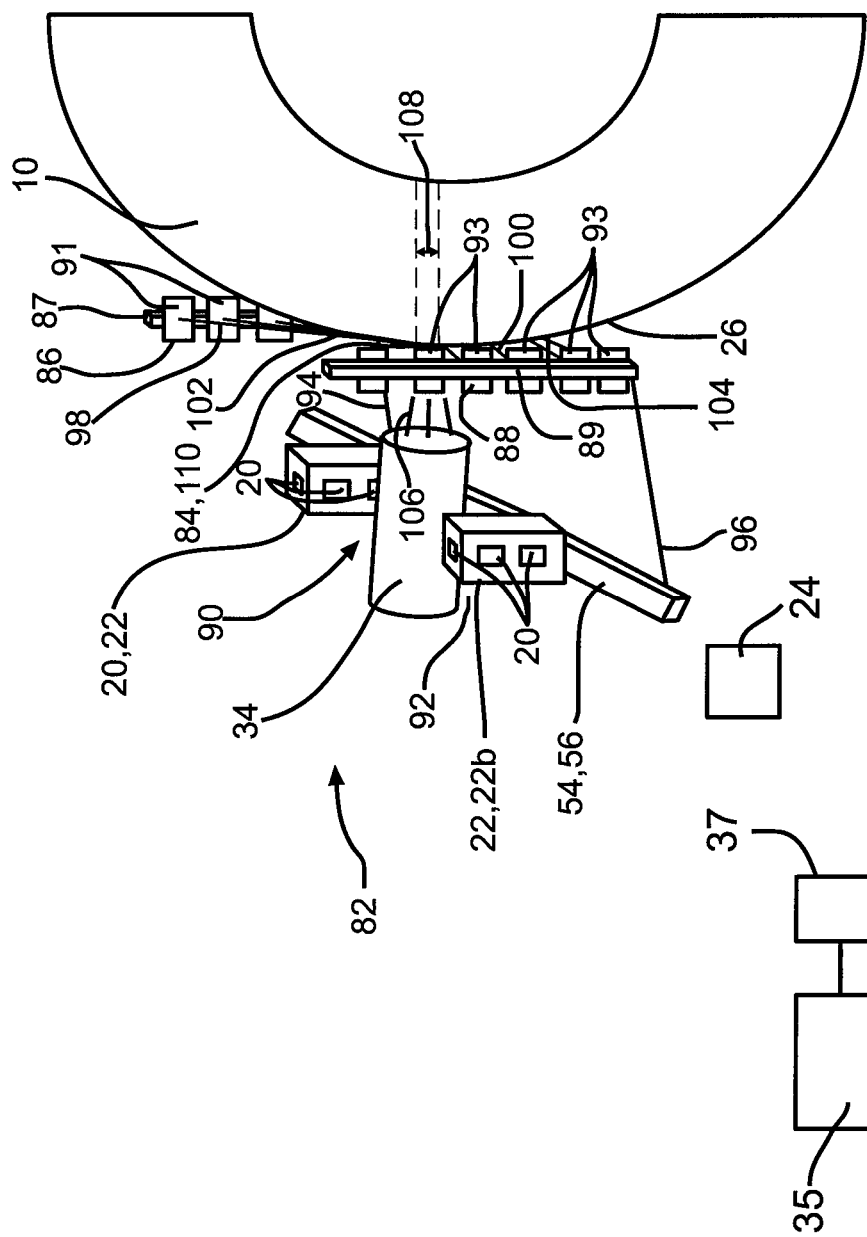
FIG. 18 is a side perspective view of an embodiment of a system for measuring a hole disposed in an outer surface of a mandrel assembly.

FIG. 18 is a side perspective view of an embodiment of a system 82 for measuring a hole 84 disposed in an outer surface 26 of a mandrel assembly 10. Although only one hole is showed in FIG. 18, the system 82 may be used to measure any number of holes 84 in the surface 26. In one embodiment, the system 82 may be used to measure 1,500 holes 84 spread around the surface 26, which may comprise a barrel of an airplane, in less than one hour without requiring any surface targets to be attached to the holes 84. In another embodiment, the system 82 may be used to measure 500,000 holes 84 in approximately an hour. In another embodiment, the system may be used to measure any number of holes 84 in approximately one hour. The system 82 may comprise a first light emitting member 86, a second light emitting member 88, a projector 34, a moveable carriage 54 which may comprise a post mill 56, two linked V-star Photogrammetry cameras 22, a computer 35, and software 37. In other embodiments, any number of light emitting members, projectors, carriages, and cameras may be utilized in varying alignments and/or configurations.

The first and second light emitting members 86 and 88 may comprise bar members 87 and 89 having attached a plurality of high intensity lights 91 and 93 such as a plurality of high intensity light emitting diodes, a plurality of high intensity halide light bulbs, and/or other types of attached lights. In other embodiments: ten separate one-million lumen output lights 86 and 88 may be attached 7.2 inches apart on 72 inch long composite or aluminum bar members 87 and 89; 300 high output light emitting diodes 86 and 88 may be equally spaced on 72 inch long bar members 87 and 89; 50 metal halide high intensity light bulbs 86 and 88 may be attached to 72 inch long bar members 87 and 89; other light sources 86 and 88 may be utilized; bar members 87 and 89 may be matched to the hole material 84 being photographed; and/or varying types, materials, sizes, numbers, and/or configurations of bar members 87 and 89 and/or lights 91 and 93 may be utilized.

the first and second light emitting members 86 and 88 may be attached to the moveable carriage 54 on opposite sides 90 and 92 of the projector 34 and cameras 22 by support members 94 and 96. The moveable carriage 54 may be adapted to travel along the surface 26. The first and second light emitting members 86 and 88 may be disposed approximately one inch from the surface 26 on opposite sides 102 and 104 of the hole 84 of the surface 26. The first and second light emitting members 86 and 88 may each be configured to separately emit varied intensity flashes of light 98 and 100 towards one of the opposite sides 102 and 104 of the hole 84 of the surface 26. In one embodiment, each of the first and second light emitting members 86 and 88 may be adapted to separately emit varied intensity flashes of light 98 and 100 towards opposite sides 102 and 104 of the hole 84 of the surface 26, such as full intensity flashes of light, ⅔ intensity flashes of light, ⅓ intensity flashes of light, and/or other varying intensity flashes of light. In still other embodiments, each of the first and second light emitting members 86 and 88 may be adapted to emit any number and intensity of flashes of light 98 and 100 towards any portions of the hole 84.

the projector 34 may be attached to the moveable carriage 54 and may be configured to project light beams 106 onto the surface 26. The moveable carriage 54 may be adapted to travel along the surface 26. The projector 34 may be adapted to project light beams 106 onto the surface 26 of varying intensities, such as a full intensity flash of light beams, a ⅔ intensity flash of light beams, a ⅓ intensity flash of light beams, and/or other varying intensity flashes of light beams. In one embodiment, the light beams 106 being projected onto the surface 26 may comprise spaced-apart dots of light. In other embodiments, the projector 34 may be adapted to project any number and intensity of light beams 106 onto the surface 26.

The cameras 22, which may comprise two V-Star cameras 22a and 22b, may be attached to the moveable carriage 54 on opposite sides 90 and 92 of the projector 34. The moveable carriage 54 may be adapted to travel along the surface 26. The cameras 22 may be adapted to take simultaneous pictures of the hole 84 of the surface 26 each time one of the first and second light emitting members 86 and 88 emits a flash of light 98 and 100 towards the hole 84 of the surface 26. The cameras 22 may also be adapted to take simultaneous pictures of the hole 84 of the surface 26 each time the projector 34 projects light beams 106 onto the surface 26. In other embodiments, as shown and discussed in FIGS. 7-17, a plurality of laser targets 20 may be attached to and/or around the cameras 22 and/or the moveable carriage 54, and a laser tracker 24 may be configured to reflect laser beams off the laser targets 20 in order to determine positions of the cameras 22.

A computer 35 may be configured to determine measurements of the hole 84 of the surface 26 utilizing Photogrammetry and pictures taken of the hole 84 of the surface 26 by the cameras 22. The computer 35 may be configured to determine a diameter 108 of the hole 84 and a center location 110 of the hole 84 utilizing the pictures of the hole 84, Photogrammetry, and feature recognition software 37. In other embodiments, the computer 35 may be configured to determine a location of the hole 84 on the surface 26 based on the positions of the cameras 22 as measured by the laser tracker 24 as shown and discussed with respect to FIGS. 7-17.

Figure 19:
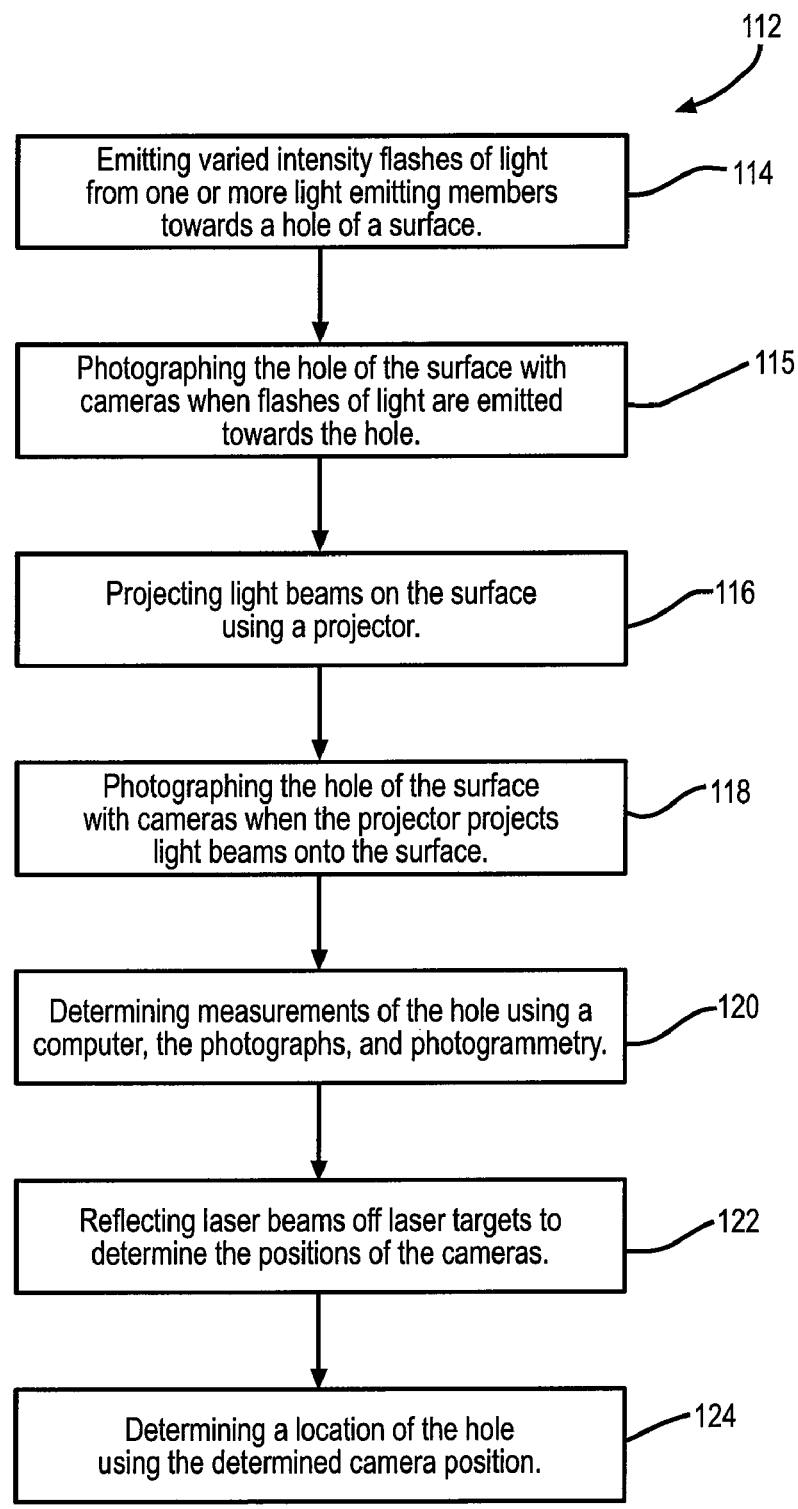
FIG. 19 is a flowchart of one embodiment of a method of measuring a hole of a surface.
Figure 20:
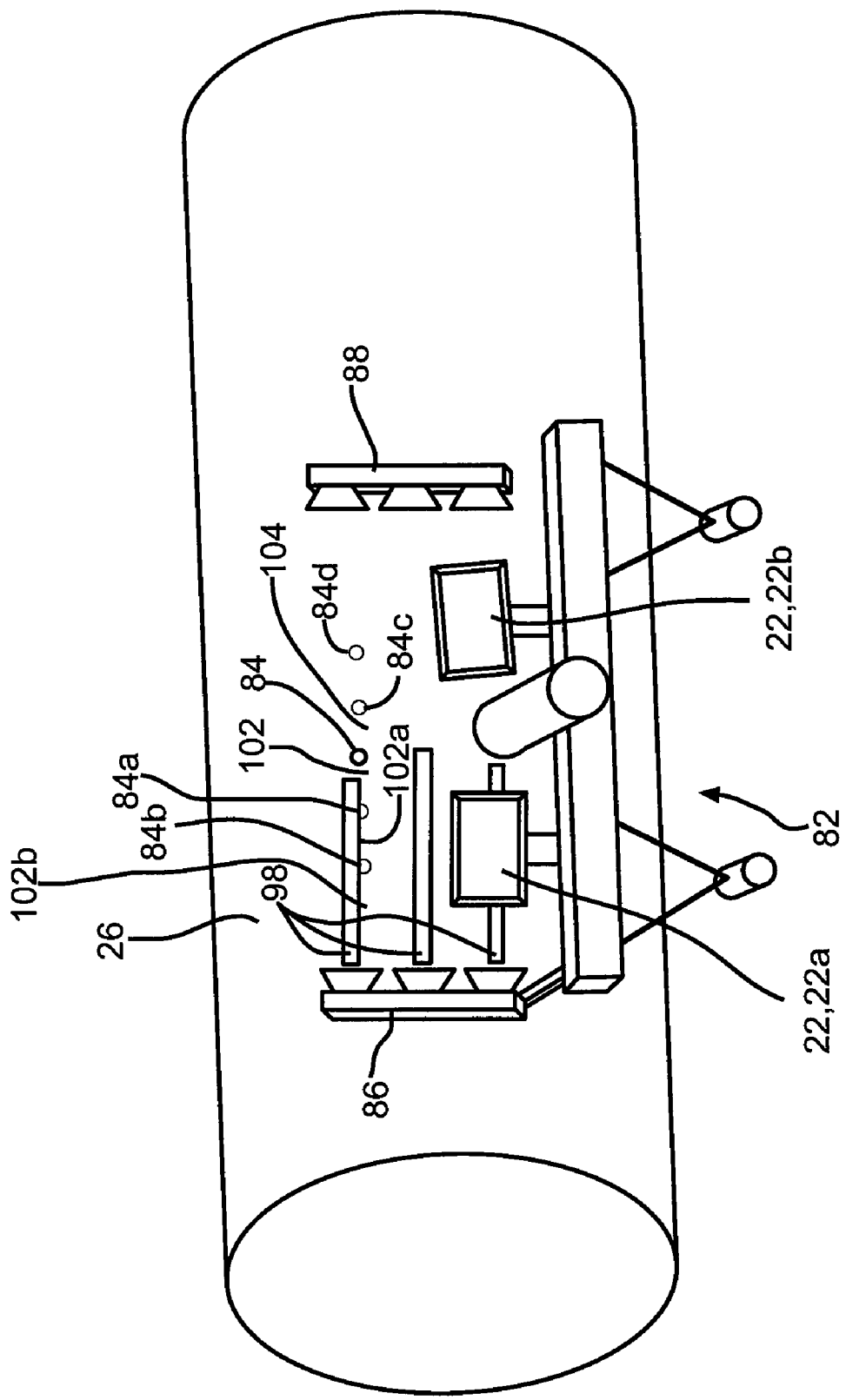
FIG. 20 is a front perspective view of one embodiment of a light emitting member of FIG. 18 emitting varied intensity flashes of light towards one side of holes of the surface.
Figure 21:
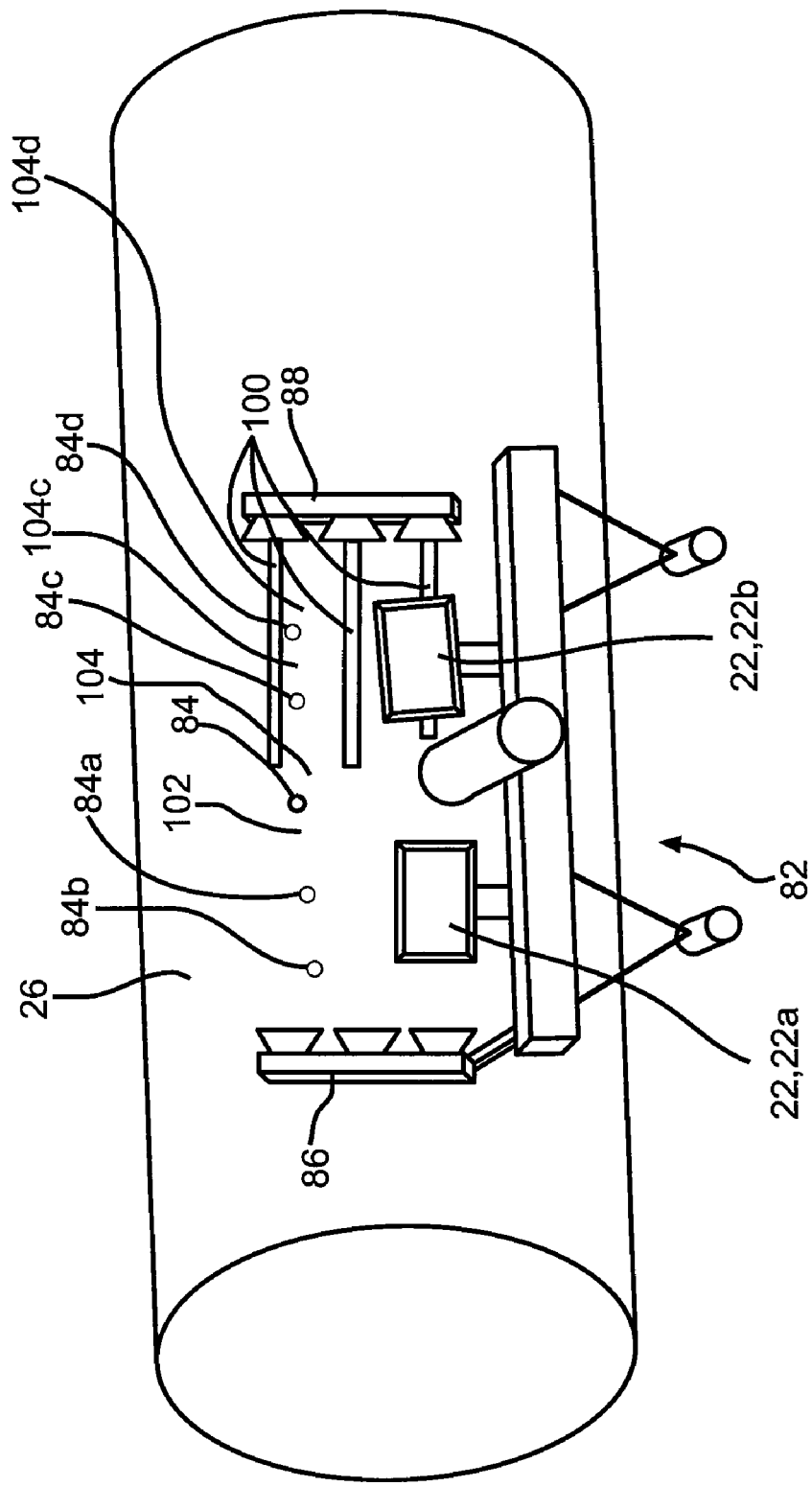
FIG. 21 is a front perspective view of an embodiment of another light emitting member of FIG. 18 emitting varied intensity flashes of light towards another side of holes of the surface.

FIG. 19 is a flowchart of one embodiment of a method 112 of measuring a hole 84 of a surface 26. In one embodiment, the method 112 may be used to measure a hole 84 of a surface 26 comprising a barrel of an airplane. The method 112 may utilize any embodiments disclosed herein for the system 82 of FIG. 18. In one step 114, varied intensity flashes of light 98 and 100 may be emitted from at least one light emitting member 86 and 88 towards the hole 84 of the surface 26. The at least one light emitting member 86 and 88 may comprise any of the embodiments disclosed herein with respect to system 82 of FIG. 18. FIG. 20 is a front perspective view of one embodiment of step 114 in which light emitting member 86 of system 82 of FIG. 18 emits a flash of light 98 towards one side 102, 102a, and 102b of holes 84, 84a, and 84b of surface 26. FIG. 21 is a front perspective view of another embodiment of step 114 in which light emitting member 88 of system 82 of FIG. 18 emits a flash of light 100 towards another side 104, 104c, and 104d of holes 84, 84c, and 84d of surface 26.

Under one embodiment of step 114, light emitting member 86 may first emit varied intensity flashes of light 98, such as a full intensity flash of light 98, a ⅔ intensity flash of light 98, and a ⅓ intensity flash of light 98, towards one side 102, 102a, and 102b of holes 84, 84a, and 84b as shown in FIG. 20. The full intensity flash of light 98 may be enough to illuminate one side 102 of hole 84. The ⅔ intensity flash of light 98 may be enough to illuminate one side 102a of hole 84a. The ⅓ intensity flash of light 98 may be enough to illuminate one side 102b of hole 84b. Lighting just one side 102, 102a, and 102b of holes 84, 84a, and 84b may be enough for edge recognition software, discussed later, to define the locations of the holes 84, 84a, and 84b. As shown in FIG. 21, light emitting member 88 may then emit varied intensity flashes of light 100, such as a full intensity flash of light 100, a ⅔ intensity flash of light 100, and a ⅓ intensity flash of light 100, towards another side 104, 104c, and 104d of holes 84, 84c, and 84d. The full intensity flash of light 100 may be enough to illuminate one side 104 of hole 84. The ⅔ intensity flash of light 100 may be enough to illuminate one side 104c of hole 84c. The ⅓ intensity flash of light 100 may be enough to illuminate one side 104d of hole 84d. Lighting just one side 104, 104c, and 104d of holes 84, 84c, and 84d may be enough for edge recognition software, discussed later herein, to define the locations of the holes 84, 84c, and 84d.

In step 115 of the method 112 of FIG. 19, the holes 84, 84a, 84b, 84c, and 84d of the surface 26 may be photographed utilizing cameras 22 each time a flash of light 98 and 100 from the light emitting members 86 and 88 is emitted towards the holes 84, 84a, 84b, 84c, and 84d of the surface 26. The cameras 22 may comprise any of the embodiments disclosed herein with respect to system 82 of FIG. 18, such as V-Star cameras 22a and 22b disposed on opposite sides 102, 102a, 102b and 104, 104c, and 104d of the holes 84, 84a, 84b, 84c, and 84d. In one embodiment of step 114, the cameras 22 of FIG. 20 may take simultaneous photographs of the holes 84, 84a, and 84b when light emitting member 86 emits varied intensity flashes of light 98 towards one side 102, 102a, and 102b of the holes 84, 84a, and 84b of the surface 26. The cameras 22 of FIG. 21 may similarly take simultaneous photographs of the holes 84, 84c, and 84d when light emitting member 88 emits varied intensity flashes of light 100 towards the another side 104, 104c, and 104d of the holes 84, 84c, and 84d of the surface 26.

Figure 22:
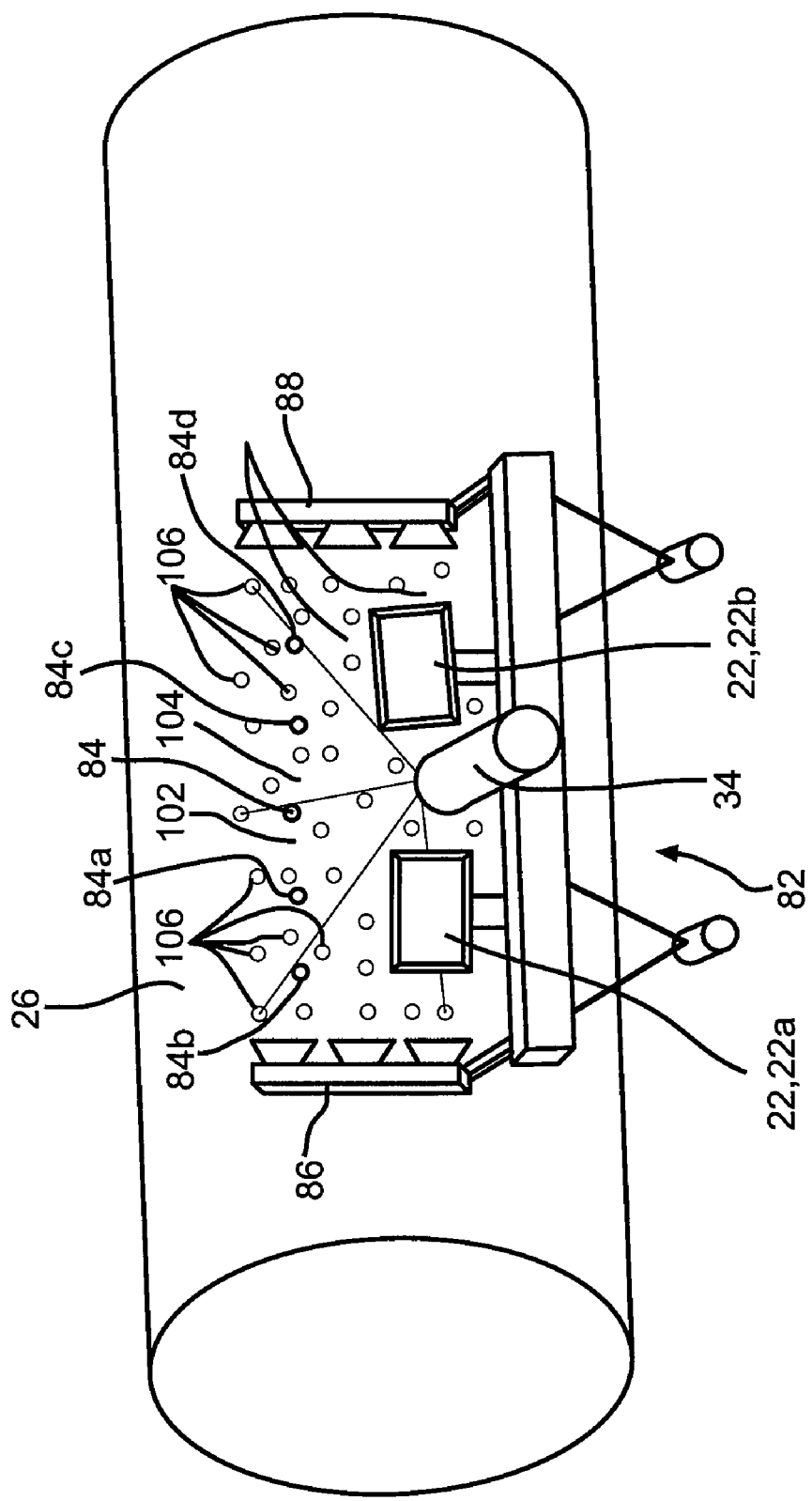
FIG. 22 is a front perspective view of an embodiment in which the projector of FIG. 18 projects light beams onto the surface.

In another step 116 of the method 112 of FIG. 19, light beams 106 may be projected onto the surface 26 utilizing a projector 34. The projector 34 may comprise any of the embodiments disclosed herein with respect to system 82 of FIG. 18. FIG. 22 is a front perspective view of one embodiment of step 116 in which projector 34 projects light beams 106 onto the surface 26. In one embodiment, the projector 34 may separately project a full intensity flash of light beams 106 onto the surface 26, a ⅔ intensity flash of light beams 106 onto the surface 26, and a ⅓ intensity flash of light beams 106 onto the surface 26. In other embodiments, the projector 34 may project any number and intensity flashes of light beams 106 onto the surface 26.

In still another step 118 of the method 112 of FIG. 19, the holes 84, 84a, 84b, 84c, and 84d of the surface 26 may be photographed utilizing cameras 22 when the projector projects light beams 106 onto the surface 26.

In an additional step 120 of the method 112 of FIG. 19, measurements of the holes 84, 84a, 84b, 84c, and 84d of the surface 26 may be determined utilizing a computer 35, the photographs taken of the hole 84 by the cameras 22, and Photogrammetry. In one embodiment, step 120 may comprise the computer 35 utilizing edge feature recognition software 37 to determine a diameter 108 of the hole 84 and a center location 110 of the hole 84 as shown in FIG. 18. The software 37 may be configured to determine diameters and center locations for each of the holes 84, 84a, 84b, 84c, and 84d shown in FIGS. 20-22 using the illumination of only one side of each of the holes as previously discussed.

In an additional step 122 of the method 112 of FIG. 19, a laser tracker 24 may reflect laser beams off laser targets 20 attached to and/or around the cameras 22 and/or a moveable carriage 54 to which the cameras 22 are attached in order to determine positions of the cameras 22. One embodiment of apparatus which may be used in step 122 is shown and discussed herein with respect to FIGS. 7-17. In yet another step 124 of the method of FIG. 19, the computer 35 may determine a location of the holes 84, 84a, 84b, 84c, and 84d on the surface 26 using the position of the cameras 22 determined in step 122. An embodiment of the apparatus which may be used in step 124 is shown and discussed herein with respect to FIGS. 7-17.

The apparatus and/or methods disclosed herein may improve hole measurement of a surface over one or more of the existing apparatus and/or methods by making hole measurements quicker, more efficient, less costly, more accurate, not require surface targets to be attached to the hole, and/or result in one or more other types of improvements.

Although this disclosure has been described with respect to certain exemplary embodiments, it is to be understood that the specific embodiments are for purposes of illustration and not limitation, as other variations will occur to those of skill in the art.

What is claimed is:

1. A system for measuring a hole of a surface comprising:
    a light emitting member which emits varied intensity flashes of light towards the hole of the surface;
    a projector which projects light beams onto the surface;
    a camera which takes a picture of the hole of the surface each time the light emitting member emits a varied intensity flash of light towards the hole of the surface and each time the projector projects light beams onto the surface; and
    a computer which determines measurements of the hole of the surface utilizing the pictures of the hole and Photogrammetry.

2. The system of claim 1 wherein the system measures a hole of a barrel of an airplane.

3. The system of claim 1 wherein there are two light emitting members which emit varied intensity flashes of light towards the hole of the surface.

4. The system of claim 3 wherein the two light emitting members are disposed on opposite sides of the projector and to emit light towards opposite sides of the hole.

5. The system of claim 1 wherein the light emitting member comprises at least one of a plurality of high intensity lights, a plurality of high intensity light emitting diodes, or a plurality of high intensity halide light bulbs.

6. The system of claim 1 wherein the light emitting member comprises a bar to which a plurality of lights are attached.

7. The system of claim 1 wherein said light emitting member emits a full intensity flash of light towards the hole of the surface, a ⅔ intensity flash of light towards the hole of the surface, and a ⅓ intensity flash of light towards the hole of the surface.

8. The system of claim 1 wherein there are two light emitting members disposed on opposite sides of the hole and each of the two light emitting members emit, towards opposite sides of the hole, a full intensity flash of light, a ⅔ intensity flash of light, and a ⅓ intensity flash of light.

9. The system of claim 1 wherein the projector projects a full intensity flash of light beams onto the surface, a ⅔ intensity flash of light beams onto the surface, and a ⅓ intensity flash of light beams onto the surface.

10. The system of claim 1 wherein there are two V-Star cameras which take simultaneous pictures of the hole of the surface each time the light emitting member emits a varied intensity flash of light towards the hole of the surface and each time the projector projects light beams onto the surface.

11. The system of claim 1 wherein there are two light emitting members disposed on opposite sides of the hole and each of the two light emitting members emit a full intensity flash of light towards one of the opposite sides of the hole of the surface, a ⅔ intensity flash of light towards one of the opposite sides of the hole of the surface, and a ⅓ intensity flash of light towards one of the opposite sides of the hole of the surface, and wherein the projector projects a full intensity flash of light beams onto the surface, a ⅔ intensity flash of light beams onto the surface, and a ⅓ intensity flash of light beams onto the surface.

12. The system of claim 11 wherein there are two V-Star disposed on opposite sides of the projector which take simultaneous pictures of the hole of the surface each time one of the two light emitting members emits a varied intensity flash of light towards the hole of the surface and each time the projector projects light beams onto the surface.

13. The system of claim 1 wherein the computer determines a diameter of the hole and a center of the hole utilizing the pictures of the hole, Photogrammetry, and feature recognition software.

14. The system of claim 1 wherein the projector, the light emitting member, and the camera are attached to a moveable carriage.

15. The system of claim 14 wherein a plurality of laser targets are attached to or around at least one of the camera or the carriage, and a laser tracker reflects laser beams off the laser targets to determine a position of the camera.

16. The system of claim 15 wherein the computer determines a location of the hole on the surface based on the position of the camera.

17. A method of measuring a hole of a surface comprising:
    emitting varied intensity flashes of light from at least one light emitting member towards the hole of the surface;
    photographing the hole of the surface utilizing at least one camera each time a flash of light from the at least one light emitting member is emitted towards the hole of the surface;
    projecting light beams onto the surface utilizing a projector;
    photographing the hole of the surface utilizing said at least one camera when the projector projects light beams onto the surface; and
    determining measurements of the hole of the surface utilizing a computer, the photographs taken of the hole by said at least one camera, and Photogrammetry.

18. The method of claim 17 wherein the method is used to measure a hole of a barrel of an airplane.

19. The method of claim 17 wherein there are first and second light emitting members disposed on opposite sides of the projector and the hole, each of the first and second light emitting members comprising at least one of a plurality of high intensity lights, a plurality of high intensity light emitting diodes, or a plurality of high intensity halide light bulbs.

20. The method of claim 19 wherein the step of emitting varied intensity flashes of light from the at least one light emitting member comprises emitting a full intensity flash of light towards one side of the hole from the first light emitting member, emitting a ⅔ intensity flash of light towards the one side of the hole from the first light emitting member, emitting a ⅓ intensity flash of light towards the one side of the hole from the first light emitting member, emitting a full intensity flash of light towards a second side of the hole from the second light emitting member, emitting a ⅔ intensity flash of light towards the second side of the hole from the second light emitting member, and emitting a ⅓ intensity flash of light towards the second side of the hole from the second light emitting member.

21. The method of claim 17 wherein the step of projecting light beams onto the surface utilizing the projector comprises projecting a full intensity flash of light beams onto the surface, a ⅔ intensity flash of light beams onto the surface, and a ⅓ intensity flash of light beams onto the surface.

22. The method of claim 17 wherein the steps of photographing the hole of the surface utilize two V-Star cameras disposed on opposite sides of the hole.

23. The method of claim 17 wherein the step of determining measurements of the hole utilizing the computer comprises the computer utilizing feature recognition software to determine a diameter of the hole and a center of the hole.

24. The method of claim 17 further comprising the step of a laser tracker reflecting laser beams off laser targets attached to or around at least one of said at least one camera or a moveable carriage to which said at least one camera is attached in order to determine a position of said at least one camera.

25. The method of claim 24 further comprising the step of the computer determining a location of the hole on the surface using the position of said at least one camera.

* * * * *